United States Patent
Brillion et al.

(10) Patent No.: US 6,895,315 B2
(45) Date of Patent: May 17, 2005

(54) METHOD FOR AUTOMATICALLY DETERMINING THE POSITION OF THE FRONT AND REAR WHEELS OF A MOTOR VEHICLE

(75) Inventors: Alain Brillion, Villeneuve Tolosane (FR); Georges Fonzes, Antibes (FR); Gerhard Goeser, Pentling (DE); Philippe Lefaure, Montbrun Lauragais (FR)

(73) Assignees: Siemens VDO Automotive, Toulouse Cedex (FR); Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/471,838

(22) PCT Filed: Mar. 1, 2002

(86) PCT No.: PCT/EP02/02237

§ 371 (c)(1),
(2), (4) Date: Sep. 15, 2003

(87) PCT Pub. No.: WO02/072369

PCT Pub. Date: Sep. 19, 2002

(65) Prior Publication Data

US 2004/0083034 A1 Apr. 29, 2004

(30) Foreign Application Priority Data

Mar. 13, 2001 (FR) .......................................... 01 03410

(51) Int. Cl.$^7$ .............................................. B60C 23/04
(52) U.S. Cl. ................................. 701/29; 701/1; 73/146
(58) Field of Search ............................... 701/1, 29, 36; 73/146, 146.2, 146.4, 146.5, 146.8; 340/426.33, 445, 447, 449

(56) References Cited

U.S. PATENT DOCUMENTS

| | | | | |
|---|---|---|---|---|
| 4,695,823 A | * | 9/1987 | Vernon | 340/447 |
| 5,808,190 A | | 9/1998 | Ernst | |
| 6,018,993 A | | 2/2000 | Normann et al. | |
| 6,259,361 B1 | * | 7/2001 | Robillard et al. | 340/447 |
| 6,271,748 B1 | * | 8/2001 | Derbyshire et al. | 340/442 |
| 6,591,671 B2 | * | 7/2003 | Brown | 73/146.5 |
| 6,691,567 B2 | * | 2/2004 | Walker et al. | 73/146 |
| 6,693,522 B2 | * | 2/2004 | Tang et al. | 340/445 |
| 6,731,205 B2 | * | 5/2004 | Schofield et al. | 340/444 |

* cited by examiner

Primary Examiner—Michael J. Zanelli
(74) Attorney, Agent, or Firm—Young & Thompson

(57) ABSTRACT

The invention relates to a method for automatically determining the position of the wheels of a motor vehicle (10), characterised in that it consists in:—measuring (21) the temperature of each wheel (12) of the vehicle; and determining (23) the position of the wheels on the vehicle according to the temperature measured. The invention also relates to a corresponding position-finding device. The device is particularly suitable for monitoring the pressure inside tires.

10 Claims, 1 Drawing Sheet

METHOD FOR AUTOMATICALLY DETERMINING THE POSITION OF THE FRONT AND REAR WHEELS OF A MOTOR VEHICLE

CROSS REFERENCE TO RELATED APPLICATIONS

This is the 35 USC 371 national stage of international application PCT/EP02/02237 filed on Mar. 1, 2002, which designated the United States of America.

FIELD OF THE INVENTION

The present invention relates to a procedure for automatically locating the wheels of a motor vehicle. More particularly, but not exclusively, such a procedure is associated with a tire pressure monitoring system.

BACKGROUND OF THE INVENTION

In point of fact it is already known to permanently monitor tire pressures of a vehicle. These pressure measurements (possibly corrected for the temperature and the aging of the tire or for any other parameter) are processed by a computer. A warning signal is emitted when a tire pressure is abnormal. The computer that processes the pressure measurements may be fitted onto the wheel itself or at any appropriate point in the vehicle.

The pressure measurements are carried out by a specific sensor associated with each wheel. This sensor sends, to a remote computer, the pressure measurement associated with a code that identifies the sensor. Of course, it is necessary for the computer to know how to assign a position on the vehicle to this identifying code. Thus, after processing, the computer must be capable of stating that the pressure measurement associated with the identifying code X comes from the right front wheel (for example). To do this, it is necessary for the computer to learn the position of the sensor and its identifying code.

This learning may be carried out manually. For example, the computer is placed in learning mode and requests the codes of each pressure sensor in a pre-established order. However, this learning procedure is relatively slow and must also be repeated each time a tire is changed. It has the drawback of requiring the driver to input data into the vehicle's computer. If the driver forgets to store the new code after a tire change, there is a risk of an error regarding the position of a wheel with abnormal pressure. This may have serious consequences.

It would seem opportune to automatically carry out this learning procedure during running of the vehicle. In particular, it is already known to correlate a radiofrequency signal from the sensors with a wheel position, or else to position, close to each wheel, low-frequency/radiofrequency antennas that, by two-way communication, make it possible to identify the position of the wheels, etc.

However, these various automatic wheel-position learning methods have the drawback that they require a complex and expensive architecture to be installed (antennas close to the wheels, two-way communication) or mathematical processing that is very complicated and difficult to make reliable (correlation between power of the radiofrequency signal and the wheel position.

SUMMARY OF THE INVENTION

The object of the present invention is to make a correlation between the sensor identifier and its position on the vehicle in an automatic, simple and reliable manner.

For this purpose, the present invention relates to a procedure for automatically locating the wheels of a motor vehicle, characterized in that it consists in:

measuring the temperature of each wheel of the vehicle; and determining the position of the wheels on the vehicle according to the temperature measured.

Thus, the position of a sensor on a vehicle is simply detected according to the temperature (and/or the change in temperature) that it measures. This is because, for example in the case of a front wheel drive vehicle, it has been noticed that the front wheels either heat up more rapidly than the rear wheels or they exhibit greater temperature variations.

Advantageously, the most rapid temperature variations are attributed to the wheels located on the front axle.

However, the procedure according to the invention is not limited to determining the front and rear wheel positions. This is because it is also possible to determine the position of the left and right wheels in the same way.

BRIEF DESCRIPTION OF THE DRAWINGS

Other objects, features and advantages will emerge from the following description, given by way of non-limiting example and with reference to the appended drawings in which.

DETAILED DESCRIPTION OF THE INVENTION

Figure 1:
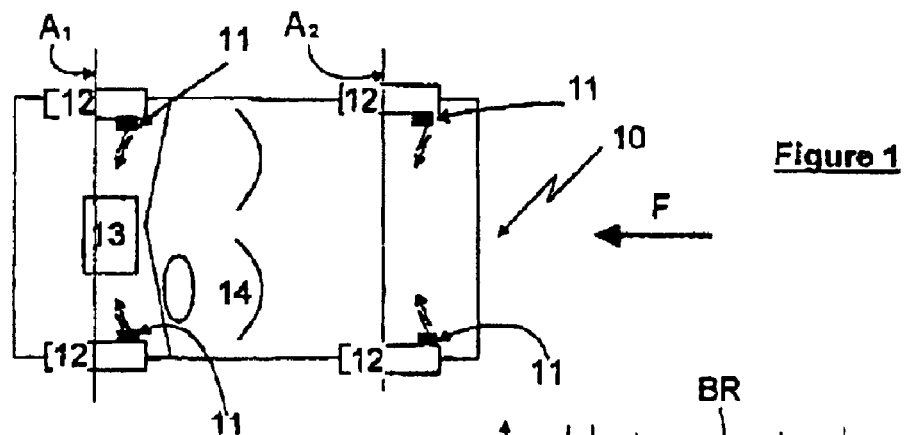
FIG. 1 is a schematic view showing the positioning of the elements of the device according to the invention on a motor vehicle.

According to the embodiment shown in FIG. 1, a motor vehicle 10, moving in the direction of the arrow F (FIG. 1), is provided with a system for monitoring the pressure of the tires 12. For this purpose, each tire 12 is provided with a pressure sensor 11, designed to send a message to a processing unit 13. This message comprises, firstly, a code that identifies the sensor 11 and, secondly, a series of data, for example pressure and temperature measurements.

The front axle of the vehicle bears the reference $A_1$ (FIG. 1) and the rear axle $A_2$.

The processing unit 13 analyses the data received and determines whether or not the pressure is normal. If the pressure is abnormal, a warning signal is sent to the driver 14. The processing unit also determines the position of the wheel on the vehicle according to the identifying code of the sensor that has sent the message.

Of course, in order for the processing unit to be able to associate a position on the vehicle with a sensor-identifying code, this association must be taught to the computer.

Within the context of the present invention, this identifying code/position of the sensor on the vehicle association is performed automatically, for example each time the car is started.

Figure 2:
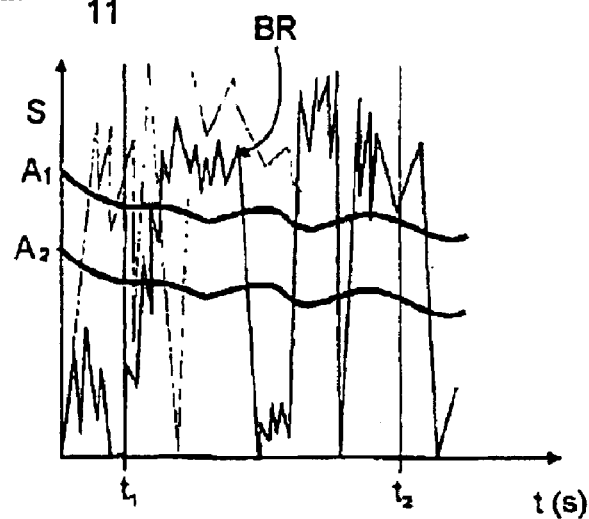
FIG. 2 is a schematic diagram showing the temperature changes in the tires according to their position on the vehicle.

In this regard, it has been noted (FIG. 2) that the temperature of each tire differs according to its position on the vehicle. In particular, for example, during braking BR, for a front wheel drive vehicle moving at a constant speed, the front wheels $A_1$ exhibit a higher temperature rise (average of the temperatures of the front wheels) than the rear wheels $A_2$ (average of the temperatures of the rear wheels). One of the heat sources for the tire is, in fact, the rim. The temperature of the tire therefore depends on the variation in the temperature on the rim. Now, during braking, the heat-up of the rims due to the friction of the brakes will be greater at the front than at the rear. Consequently, in the case of braking, the front wheels will be subjected to a greater temperature rise than the rear wheels. The use of this information allows us to differentiate the tires of the front axle from those of the rear axle.

In the absence of braking, the main heat source for the tires is the transmission of the drive torque to the road. Consequently, the set of wheels that heats up the most is that on the drive axle.

The same applies in the case of the right and left tires, which, when turning, undergo different temperature rises.

Figure 3:
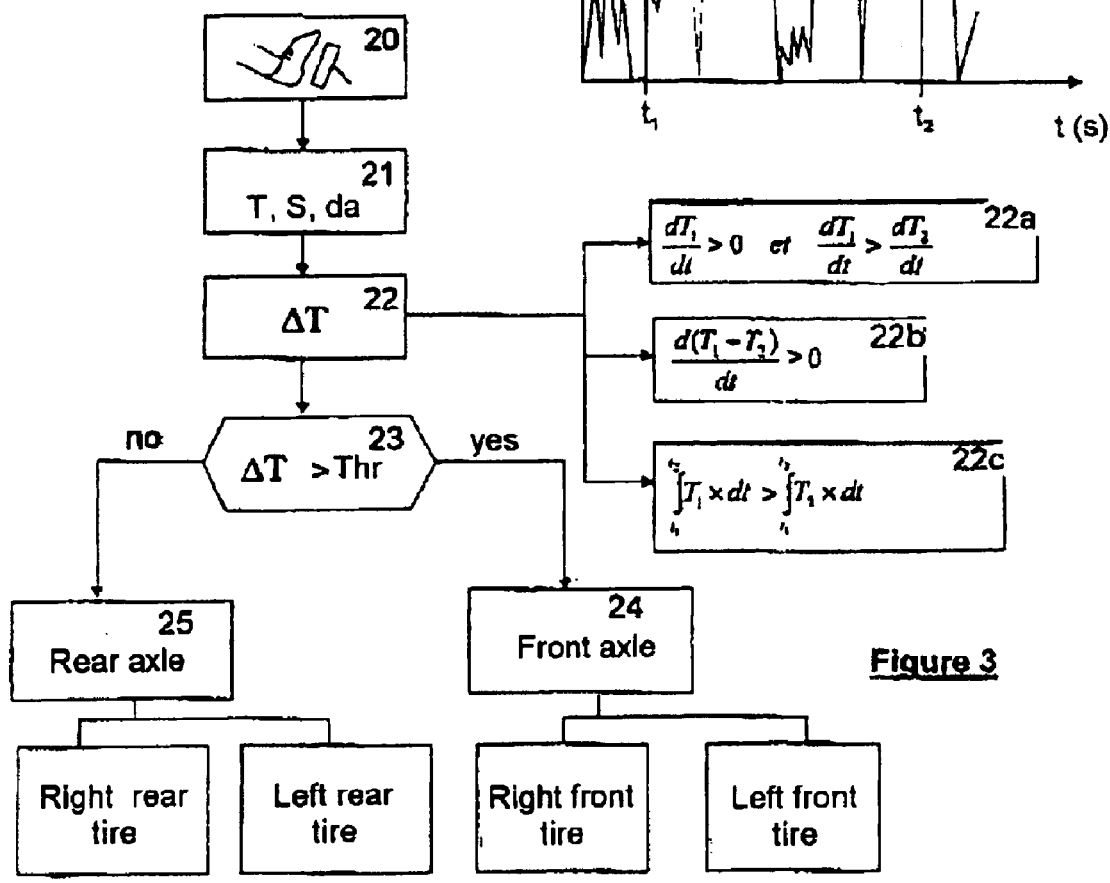
FIG. 3 is a logic diagram representing the procedure according to the present invention.

The procedure according to the invention (FIG. 3) consists in:
- a) detecting the occurrence of braking 20. This braking (indicated schematically by the driver's foot 14 pressing on a brake pedal) is one of the data usually delivered to the processing unit 13;
- b) measuring, 21, the temperature within each tire, the speed S of movement of the vehicle and the steering wheel angle α, and taking into account the type of drive axle da (front or rear);
- c) determining, 22, the temperature variation ΔT between two times $t_1$ and $t_2$ (FIG. 2); and
- d) if the temperature variation ΔT exceeds, 23, a certain threshold Thr, then the temperature measured corresponds to a front tire 24, otherwise it corresponds to a rear tire 25.

The temperature variation ΔT between two times $t_1$ and $t_2$ may be determined in several ways. For example, it is possible to make:

a comparison of the derivatives of the type:

$$\frac{dT}{dt} > 0 \text{ and } \frac{dT_1}{dt} > \frac{dT_2}{dt};$$

$T_1$ being the temperature at time $t_1$ and $T_2$ the temperature at time $t_2$ in the same tire;

or a comparison of the difference of the type:

$$\frac{d(T_1 - T_2)}{dt} > 0;$$

or else a comparison of the integrals of the type:

$$\int_{t_1}^{t_2} T_1 \times dt > \int_{t_1}^{t_2} T_2 \times dt;$$

or else a comparison of the values of the type $T_1 > T_2$.

Whatever determination procedure is used, if the temperature variation determined is greater than a threshold Thr, the corresponding wheels are the front wheels (in the case of front wheel drive) and vice versa in the case of rear wheel drive. This threshold Thr is determined on a test bed for each type of vehicle.

When the speed of the vehicle is constant, the highest temperature values are in fact considered as belonging to the same axle. If the vehicle has front wheel drive, this axle is the front axle $A_1$.

Likewise, the sensors measuring the most rapid temperature variations are considered as belonging to the same axle (front axle).

In the example described, the procedure according to the invention also makes it possible to determine the position of the right and left wheels. This is because the right and left wheels have different temperatures, for example when turning. Knowing the direction of rotation of turning (for example, the steering wheel angle), it is then possible to determine the position of the right and left wheels. By analysing the steering wheel angles α, in the case of a larger angle on one side (for example on the left because of traffic circles), an unsymmetrical temperature rise between the right side and the left side is detected.

The procedure according to the invention therefore consists in making a front/rear identification and a right/left identification of the wheels on one and the same axle, in combination with an analysis of the steering wheel angles α and the temperature changes. Thus, each wheel of the vehicle is identified.

The procedure according to the invention is carried out automatically at each startup. Once the position of the sensors is acquired with certainty, the identification procedure according to the invention is interrupted.

It is also possible to arrange for the procedure according to the invention to be interrupted after a predetermined delay (for example 15 min) and for a position to be assigned to each sensor on the vehicle.

The present invention also relates to a system for automatically locating the wheels of a motor vehicle 10, of the type comprising a number of pressure sensors 11 each placed on a wheel 12 of the vehicle and transmitting, to a central processing unit 13, the pressure values measured in each wheel, and an identifier specific to each sensor. These pressure sensors also measure the temperature T within each wheels and transmit the measured values to the central processing unit 13. The central processing unit being designed to determine the location of each wheel according to the temperatures measured.

Of course, the present invention is not limited to the embodiment described above. Thus, the procedure according to the invention may be carried out when the vehicle has already traveled a certain distance (or after a time delay) so as to wait until the temperature differences between front and rear (or right and left) wheels have been properly established.

What is claimed is:

1. A process for automatically locating the wheels (12) of a motor vehicle (10), comprising:
    measuring the steering angle of each wheel;
    measuring (21) the temperature of each wheel of the vehicle; and
    determining (23) the position of the wheels on the vehicle according to the temperature measured, wherein,
    the temperature is measured using sensors (11), and,
    the temperature sensors (11) measuring the most rapid temperature variations are identified as belonging to the same axle.

2. The automatic location process as claimed in claim 1, wherein, when the speed of the vehicle is constant, the temperature sensors (11) measuring the highest temperature values are considered as belonging to the same axle of the vehicle.

3. The process as claimed in claim 2, characterized in that, when the vehicle has front wheel drive, the sensors measuring the highest temperatures are identified as belonging to the front axle ($A_1$).

4. The process as claimed in claim 1, characterized in that, after prolonged braking, the sensors measuring the most rapid temperature variations are identified as belonging to the front axle.

5. The automatic location process as claimed in claim 1, characterized in that a temperature variation ($\Delta T$) is established by comparison of at least one of the derivatives (22a) of the temperature measured for each wheel, the difference (22b) of the temperatures measured for each wheel, and the time integral (22c) of the temperatures measured for each wheel.

6. The process as claimed in claim 1, characterized in that the step of measuring (21) the temperature of each wheel of the vehicle is carried out continuously, each time the vehicle is started.

7. The process as claimed in claim 1, characterized in that, after a predetermined time delay has elapsed, the temperature measurements are interrupted and a position on the vehicle is assigned to each sensor.

8. A process for automatically locating the wheels (12) of a motor vehicle (10), comprising:

measuring the steering angle of each wheel;

measuring (21) the temperature of each wheel of the vehicle;

determining (23) the position of the wheels on the vehicle according to the temperature measured; and determining a front/rear location and a right/left location wheel of the same axle, by combining an analysis of the steering wheel angles and the changes in the temperature.

9. The process as claimed in claim 8, wherein the step of measuring the temperature of each wheel of the vehicle is carried out continuously, each time the vehicle is started.

10. The process as claimed in claim 8, characterized in that, after a predetermined time delay has elapsed, the temperature measurements are interrupted and a position on the vehicle is assigned to each sensor.

* * * * *